Patented Apr. 6, 1954

2,674,633

UNITED STATES PATENT OFFICE 2,674,633

CHLORINATION OF HYDROCARBONS

Otto Reitlinger, Kew Gardens, N. Y.

No Drawing. Application December 7, 1948,
Serial No. 64,050

6 Claims. (Cl. 260—654)

This application is a continuation-in-part of my co-pending application Serial No. 651,979, filed March 4, 1946, now abandoned.

The invention relates to a catalytic process for the preparation of organic halides and to an improved catalyst for such halogenation reactions.

In my co-pending application, Serial No. 571,544, now abandoned, I have described a process for preparing organic halides by reacting hydrocarbons with hydrogen halides and oxygen at temperatures between 380° and 600° C. in the presence of a non-volatile iron oxide catalyst, which I found to be a good catalyst by itself without any addition of promoting substances, and which, because of its non-volatility, has many advantages over the conventional volatile chlorination catalysts, such as cupric chloride. In said co-pending application I have further described a method according to which ferric oxide powder is provided with very fine channels for the passage of the reacting gases. This is accomplished by mixing the catalyst with, or precipitating it on, glass wool or mineral wool. This method has certain drawbacks due to the difficulty of reproducing the same activity in different batches of the catalytic mass; neither is it easy to obtain in this way a completely homogeneous activity of the catalyst per unit volume throughout the reactor.

The object of this invention is to provide a method for the halogenation of hydrocarbons with hydrogen halides and oxygen in the presence of an iron oxide catalyst of a particular physical structure which brings about a high halogenation rate and maintains its high catalytic action over long periods of time.

Other objects and advantages will be apparent from a consideration of the specification and claims.

According to the invention the halogenation, particularly the chlorination, of hydrocarbons or partially halogenated hydrocarbons is carried out in the presence of a contact mass in which iron oxide particles are assembled on a support in the form of a porous surface layer, and this porous surface layer may be defined as a packing of discrete coherent iron oxide particles firmly adhering to the support while maintaining their powdery state.

Preferably, the contact mass consists of a porous granular support which carries the active material in two physically different layers of the same or a similar composition. The inner layer covers the inner and outer surfaces of the porous carrier in the usual way, i. e. the coating is not completely coherent but interrupted at least by the pores of the carrier, whereas the outer catalytic powder layer covers uniformly the whole surface.

It is not possible to obtain a uniform coherent surface layer, as defined hereinbefore, upon a porous carrier by merely coating or impregnating the carrier with the ferric oxide. If the carrier, even in a moist state, is treated with the iron oxide in powder form, the powder does not adhere to the carrier so firmly as to form a homogeneous coating. If the carrier is impregnated with a solution or suspension of an iron compound and afterwards dried by heating, the coating shrinks and the surface consists more or less of alternating areas formed by the catalyst proper and by the material and the pores of the support. Heretofore, it was even presumed such a structure of the surface of a contact mass was particularly efficient (cf. e. g. the book "Catalysis" by Berkman, Morrel and Egloff, 1940, pp. 456–482 where the favorable influence of the pores of the carrier material upon the efficiency of the catalyst is described).

In order to obtain a coherent and homogeneous coating of iron oxide powder upon a carrier, it is necessary to increase the adhesion of the iron oxide powder particles to the support. According to this invention, this increased adhesion is obtained by a suitable pre-treatment of the support, for instance by impregnating it with a hydrophilic material or, preferably, by precipitating from a solution an intermediate layer of an iron compound forming ferric oxide on heating upon the support. If subsequently iron oxide powder is applied to the impregnated support, it adheres firmly thereto. In this way, a contact mass is formed which, even under the microscope, has a completely uniform and homogeneous appearance and a catalytic efficiency by far superior to contact masses consisting of the same support and the same catalyst but prepared by impregnation only or by powder coating only.

A possible explanation for the surprisingly increased activity of the new contact masses may be as follows: When the impregnated granules of a carrier are agitated in a humid atmosphere with the powder of a catalytic material, the particles of this powder adsorb water vapor and will adhere to each other and form a coherent layer around the granules; when this layer is then allowed to cohere or to bake together, for instance by subjecting the granules to the action of hydrogen chloride and oxygen at elevated temperatures, it will be converted to an extremely porous shell surrounding the granules of the carrier and wholly composed of catalytic material.

It appears that the mechanical stability of the outer shell or surface layer at normal temperatures is maintained by the adsorption of water vapor by the hydrophilic intermediate impregnation layer, and by the adsorption of water vapor by the internal surface of said shell or surface layer, the internal surface of which is formed by the pores or interstices in between the individual catalytic powder particles. In the reactor, the water vapor will be desorbed but the powder particles will cohere to each other and adhere to the support under the action of the elevated temperature; as soon as the granules leave the reactor, they readsorb water vapor and the original state is reestablished.

The ordinary contact masses prepared by merely impregnating a carrier with the catalytic agent and drying it show, under the microscope, a chessboard-like surface formed by alternating zones of catalytic and carrier materials. These alternating zones correspond to areas of different catalytic activity, the reaction being confined to the zones covered by the catalyst.

In contradistinction to these contact masses prepared by impregnation only, the contact masses obtained according to this invention have a coherent porous outer layer of the catalytic agent not interrupted by inactive areas of the carrier material. The active inner and outer surfaces offered to the reacting gases are, therefore, greatly increased and increase correspondingly the reaction rate.

Cohering or baking together of the small powdery particles composing the outer layer may, if necessary, be brought about by the action of hydrogen chloride and oxygen at elevated temperatures or by heating only; the best way will depend on the physical and chemical properties of the particular materials that are used for activating the reactions hereinafter described.

Some typical chlorination reactions carried out according to this invention will now be described in the following examples, together with an example for preparing the catalyst. The examples will also show the higher conversion rate obtained with the iron oxide catalyst on the particular structure defined hereinbefore in comparison with iron oxide catalysts prepared according to conventional methods.

EXAMPLE I

Granules of suitable size of any of the known porous carrier materials such as fuller's earth, silica gel, and the like, but preferably granules of pumice within the range of 20 to 60 mesh are allowed to stand in a concentrated aqueous ferric chloride solution for a period of about 24 hours. They are then separated from the remaining ferric chloride solution and dried at a temperature of about 180° C. These grains are filled into a tube through which gaseous ammonia is passed slowly for a period of about one hour. The grains are then brought into concentrated aqueous ammonia and left therein for about 24 hours.

The aqueous ammonia is then decanted and the grains are washed until red litmus paper retains its color and the water suspended precipitate of ferric hydroxide has been removed with the wash water. The grains are dried at a temperature of about 200° C. and filled into a reactor tube in which they are subjected, at a temperature of about 490° C. and for a period of about 2 hours, to the action of a gas stream containing about ten parts by volume of air and about four parts by volume of hydrogen chloride. The flow velocity of the gas stream is immaterial; I prefer to apply a space velocity of about 3.25 per minute.

After cooling, the contact mass proper is prepared by shaking the impregnated grains with ferric oxide, e. g. in a proportion of 40 parts of ferric oxide to 60 parts of impregnated grains. The ferric oxide is preferably applied in the form of a fine powder, for instance so fine that 95 per cent pass through a sieve of 325 mesh. The powder is gradually added to the grains in a humid atmosphere, which may be super-saturated with water vapor. Steam may be introduced prior to each—or during the—shaking operation until small droplets of condensed water start to appear on the walls of the shaking vessel. In this way, the grains adsorb a certain amount of water and hold the ferric oxide powder firmly upon their surface. If this operation has been properly done the walls of the shaking vessel should not show more than slight traces of the ferric oxide; the humidity should be controlled in such a way that the finished grains do not leave behind more than scant traces of ferric oxide when sliding over dry glass or smooth paper. This is a good indication that the ferric oxide layer adheres sufficiently to the pumice supports. Microscopic observation of the grains shows that they are completely covered with a dense, velvet-like layer and do not show any free spots; each grain presents on its surface the aspect of a sponge, the small particles of the ferric oxide powder forming the innumerable walls thereof.

145.5 grams of the above specified mass, containing about 58 per cent of impregnated pumice grains, about 39 per cent of ferric oxide applied in powder form, and about 3 per cent of water, are loaded into a vertical Pyrex glass tube of 26.5 mm. I. D. over a length of 294 mm. The part of the tube above the contact mass is filled with small pieces of stoneware over a length of about 235 mm. and serves as a preheater.

The reactor is heated at a temperature of about 490° C. and the preheater is brought to a temperature of about 440° C. After passing a gas mixture containing about 10 parts by volume of air and about 4 parts by volume of hydrogen chloride through the tube for a period of about 2 hours, the reactor is ready and fit to be used for oxidation and chlorination processes.

EXAMPLES II

Table I shows the results of various runs made in the reactor and with the contact mass described in Example I, for the chlorination of methane by means of hydrogen chloride and oxygen in air according to the reaction $$CH_4 + xHCl + x/2O_2 = CH_{4-x}Cl_x + H_2O$$

wherein $x$ stands for any integer from 1 to 4.

Table I

[Gas mixture by volume: $CH_4$:HCl:Air=4:4:10.]

| Run No. | Temperature, °C. | | Flow Velocity, cc./min. | Space Velocity | Percentage-Yield | |
|---|---|---|---|---|---|---|
| | Reactor | Preheater | | | HCl basis | $CH_4$ basis |
| A | 491 | 400 | 389 | 2.46 | 55.80 | 29.90 |
| B | 491 | 400 | 507 | 3.24 | 56.20 | 30.12 |
| C | 491 | 430 | 507 | 3.24 | 56.92 | 30.53 |
| D | 491 | 440 | 651 | 4.16 | 54.25 | 30.30 |

The chlorinated end product consists of about 23.50 per cent of methyl chloride, 43.50 per cent of methylene chloride, 28 per cent of chloroform, and 5 per cent of carbon tetrachloride. The table shows a uniform and very high conversion of 54 to 57 per cent with respect to the hydrogen chloride and of about 30 per cent with respect to the methane.

Whereas Table I shows the results obtained with the novel contact mass, Table II gives the results of control tests made with the same reactor, for the same reaction, under exactly the same experimental conditions, and with the same chemical compound, ferric oxide, as a catalyst. The ferric oxide was used as such or precipitated on various porous carriers in accordance with standard methods of preparation.

drogen chloride and oxygen or air according to the reaction $$C_2H_4 + xHCl + x/2O_2 = C_2H_{4-x}Cl_x + xH_2O$$

wherein $x$ stands for any integer from 1 to 4. The runs were made with the same catalyst material and in the same reactor as the runs of Table I.

Table III

[Gas mixture by volume: $CH_4 : HCl : Air = 4 : 4 : 10$.]

| Run No. | Temperature, °C. | | Flow Velocity, cc./min. | Space Velocity | Gas Mixture by volume | | | Percentage Yield | |
|---|---|---|---|---|---|---|---|---|---|
| | Reactor | Preheater | | | $C_2H_4$ | HCl | Air | HCl Basis | $C_2H_4$ Basis |
| E | 491 | 440 | 510 | 3.26 | 4 | 4 | 10 | 57.73 | 26.96 |
| F | 491 | 440 | 452 | 2.9 | 2 | 4 | 10 | 48.82 | 44.90 |

In run E, the chlorinated end product consists of 16 per cent vinyl chloride, 33 per cent dichloroethylene, 46 per cent trichlorethylene, and 5 per cent tetrachloroethylene. For run F, the corresponding figures are 16, 35, 37, and 12 per cent.

If the catalysts of Table II are used, hardly 10

Table II

| Run No. | Temperature, °C. | | Flow Velocity, cc./min. | Contact mass | Percentage-Yield | |
|---|---|---|---|---|---|---|
| | Reactor | Preheater | | | HCl basis | $CH_4$ basis |
| G | 491 | 391 | 469 | $Fe_2O_3$ powder on pumice (mesh 60) prepared by shaking in humid atmosphere. | 8.05 | 4.3 |
| H | 491 | 400 | 505 | Fuller's earth (mesh 40) impregnated with $Fe_2O_3$. | .83 | .45 |
| I | 491 | 391 | 506 | $Fe_2O_3$ Hematite crystals (mesh 20). | 5.98 | 3.2 |
| J | 491 | 391 | 379 | $Fe_2O_3$ amorphous mineral grains (mesh 20 to 60). | 1.14 | .6 |
| K | 491 | 400 | 513 | Grains of pumice (mesh 20 to 60) impregnated with $Fe_2O_3$. | 10.0 | 5.0 |
| L | 491 | 400 | 507 | Silica Gel (mesh 14 to 20) impregnated with $Fe_2O_3$. | 5.0 | 2.5 |
| M | 487 | 400 | 125 | $Fe_2O_3$ powder on pumice (mesh 80 to 120) prepared by shaking in humid atmosphere. | 16.05 | 8.2 |

In runs H, K, and L, the impregnation of the supports was carried out in the same way as described in the first part of Example I (supra) but without shaking the impregnated grains with the ferric oxide powder.

A comparison of Table I and Table II shows that pumice grains impregnated with ferric oxide according to known methods convert 10 per cent of the hydrogen chloride (run K) whereas the novel catalyst, under exactly the same conditions, brings about a conversion of 56 to 57 per cent (runs A–D).

Table II shows further that the same poor results were obtained by using ferric oxide without a carrier (runs I, J) or by applying ferric oxide powder to an unimpregnated carrier (run G). Even when in the latter case the chlorination is carried out at very low and uneconomic gas velocities (run M) the yields are less than a third of those obtained with the new catalyst at normal velocities.

EXAMPLE III

Table III shows the results of two runs made for the chlorination of ethylene by means of hyper cent of the hydrogen chloride can be converted to chlorinated olefines whereas under the same conditions the novel catalyst brings about a conversion of 57.73 per cent for equal parts by volume of hydrogen chloride and ethylene resp. of 48.82 per cent for a ratio of ethylene to hydrogen chloride of 2:4.

In the experiments reported in the foregoing examples and tables the chlorinated compounds were removed from the gases by cooling them to a temperature of −78° C. At this temperature a considerable part of the obtained methyl chloride and vinyl chloride was not yet condensed because of their still high vapor pressures at −78° C. and their low concentrations in the exit gases due to the dilution with the nitrogen contained in the used air. The total of these chlorinated products is readily recovered by condensing at temperatures lower than −78° C. or at pressures higher than atmospheric pressure, or by using oxygen instead of air. In such a case, e. g. in commercial production, the yields will be considerably higher than those indicated in the tables. For the chlorination of methane under the conditions of runs B and C of Table I, and for the chlorination of ethylene under the conditions of run E of Table III the conversion of HCl is then about 70 per cent.

The chlorination of saturated or unsaturated aliphatic and cyclic hydrocarbons and the composition of the chlorinated products is controlled by the nature of the hydrocarbon and the ratio between hydrogen chloride and hydrocarbon introduced into the reactor. The greater this ratio is, the greater will be the proportion of higher chlorinated hydrocarbons in the end product. The novel catalysts can also be used with advantage for the chlorination of other than aliphatic hydrocarbons. The chlorination of benzene, for instance, is readily obtained in this way, and the hydrogen chloride is wholly combined with the benzene to chloro substitution products of benzene when a sufficient excess of benzene is used.

Bromination of the hydrocarbons may be carried out in the same way as the chlorination. The ferric oxide may be used in combination with other metal oxides or metal compounds and such metal catalysts may be prepared in the same way as ferric oxide either for both or only for one of the surface layers upon the carrier material. Grains of a porous carrier are first impregnated with ferric oxide as described above and then shaken with another metal oxide in powder form, for instance with chromium sesquioxide, manganese sesquioxide, vanadium sesquioxide, cobalt oxide, thorium oxide, or other oxides of the transition metals known for their catalytic activity. Further, the grains of the carrier may be first impregnated with a metal oxide other than ferric oxide, and a powder of ferric oxide may be applied as the outer layer. The efficiency of the catalyst is controlled and determined by the size of the particles of the catalytic powder, by the thickness of the outer layer formed by this powder, and by the size of the grains of the carrier material.

It is also possible to prepare mixed iron oxide catalysts by applying to the impregnated granules of the carrier a mixture of iron oxide powder with another metal oxide powder. These powders may be prepared either by mere mixing or by co-precipitating the iron oxide together with another metal oxide and subsequently converting the precipitate to a powder.

It may be noted that, depending on the conditions of the reaction, the ferric oxide may be converted during the chlorination reaction partially in an iron oxychloride, for instance of the formula FeOCl. Such conversion does not affect the catalytic activity and efficiency of the original ferric oxide contact.

Chlorination reactions are strongly exothermic. The usual carrier material for catalysts has a very low thermal conductivity; it is, therefore, often difficult to maintain the optimum temperature for a catalytic reaction within the contact mass and to avoid local overheating and decompositions of the reaction products. This drawback can be obviated by using a porous metallic carrier material of high thermal conductivity.

A metal carrier must be used for which the electromotive force of the oxidation reaction to the lowest oxidation stage ranges in the electromotive force series below the electromotive force of the reduction reaction for the metal oxide which is used as the catalyst, to the next lower oxidation stage. Therefore, bronze is suitable as a carrier for chromium sesquioxide but not for ferric oxide.

The surface of the porous metal carrier must be pretreated by impregnation in the same way as described above for non-metallic carriers in order to obtain a firmly adhering surface coating of the powdered iron oxide or iron oxide combination. Porous metals as produced for various technical applications by sintering metal powder ("oilite" bearings, filter plates, etc.) de-oiled and sufficiently disintegrated, are a suitable carrier material.

What I claim is:

1. A method of preparing organic chlorides by reacting in the gaseous phase a member of the group consisting of hydrocarbons and partially chlorinated hydrocarbons with hydrogen chloride and oxygen at temperatures between about 400 and 490° C. in the presence of a catalyst which consists of a porous carrier material and ferric oxide in two different forms, part of said ferric oxide being applied to the support by impregnating it with an iron compound forming ferric oxide on heating, the other part by applying solid ferric oxide in comminuted form to the impregnated support.

2. A method of preparing organic halides comprising reacting in the gaseous phase a member of the group consisting of hydrocarbons and partially halogenated hydrocarbons with a hydrogen halide and oxygen, at temperatures between about 400 and 490° C. in the presence of a ferric oxide contact mass consisting of a porous support carrying the ferric oxide in two physically different layers, said two layers comprising an outer surface layer having a dense spongy structure formed by coherent powdered particles of the oxide and an inner impregnating layer containing hydrophilic ferric oxide bonding the outer layer to the support.

3. A method according to claim 2 wherein the hydrogen halide is hydrogen chloride.

4. A method according to claim 2 wherein the member of the group consisting of hydrocarbons and partially halogenated hydrocarbons is methane.

5. A method according to claim 2 wherein the member of the group consisting of hydrocarbons and partially halogenated hydrocarbons is ethylene.

6. A method of preparing organic halides comprising reacting in the gaseous phase a member of the group consisting of hydrocarbons and partially halogenated hydrocarbons with a hydrogen halide and oxygen, at temperatures between 400 and 490° C., in the presence of a ferric oxide contact mass consisting of a porous support carrying the ferric oxide in two physically different layers, said two layers comprising an outer surface layer having a dense spongy structure formed by coherent powdered particles containing ferric oxide and an inner impregnating layer containing hydrophilic ferric oxide bonding the outer layer to the support.

References Cited in the file of this patent

UNITED STATES PATENTS

| Number | Name | Date |
|---|---|---|
| 1,654,821 | Krause et al. | Jan. 3, 1938 |
| 2,206,399 | Grosvenor et al. | July 2, 1940 |

FOREIGN PATENTS

| Number | Country | Date |
|---|---|---|
| 108,421 | Austria | Dec. 27, 1927 |
| 486,952 | Germany | Nov. 30, 1929 |
| 937,955 | France | Mar. 30, 1948 |